(12) United States Patent
Sönsteröd

(10) Patent No.: US 8,393,445 B2
(45) Date of Patent: Mar. 12, 2013

(54) SHOCK ABSORBER VALVE WITH SPRING ARRANGEMENT

(75) Inventor: Lars Sönsteröd, Sandared (SE)

(73) Assignee: Ohlins Racing AB, Upplands Vasby (SE)

( * ) Notice: Subject to any disclaimer, the term of this patent is extended or adjusted under 35 U.S.C. 154(b) by 331 days.

(21) Appl. No.: 12/682,770

(22) PCT Filed: Oct. 15, 2008

(86) PCT No.: PCT/SE2008/051163
§ 371 (c)(1),
(2), (4) Date: Aug. 12, 2010

(87) PCT Pub. No.: WO2009/051554
PCT Pub. Date: Apr. 23, 2009

(65) Prior Publication Data
US 2011/0041941 A1    Feb. 24, 2011

(30) Foreign Application Priority Data

Oct. 17, 2007    (SE) ........................... 0702317

(51) Int. Cl.
*F16F 9/512*    (2006.01)
(52) U.S. Cl. .............. 188/266.1; 188/266.4; 188/275; 188/282.5; 188/322.13
(58) Field of Classification Search ............... 188/266.1, 188/266.4, 266.5, 266.6, 322.13–322.15, 188/322.17–322.19, 275, 282.5, 282.8, 285, 188/313, 322.2; 251/325
See application file for complete search history.

(56) References Cited

U.S. PATENT DOCUMENTS

| 4,400,861 A | 8/1983 | Parker |
| 4,535,816 A | 8/1985 | Feder et al. |
| 2006/0266601 A1* | 11/2006 | McAndrews ................ 188/275 |
| 2007/0034464 A1* | 2/2007 | Barefoot ................ 188/322.15 |

FOREIGN PATENT DOCUMENTS

| DE | 10312977 A1 | 10/2004 |
| WO | WO 2006135319 A1 | 12/2006 |

OTHER PUBLICATIONS

International Search Report PCT/SE2008/051163; dated Jan. 7, 2009; 3 pages.

* cited by examiner

*Primary Examiner* — Pamela Rodriguez
(74) *Attorney, Agent, or Firm* — Knobbe Martens Olson & Bear, LLP

(57) ABSTRACT

A valve (1) comprises a spring arrangement comprising a stiff (5) and a weak spring (6). The weak spring (6) has the form of a thin, circular disc having a first spring surface (6') and a second spring surface (6'), and an inner spring part (6a) and an outer spring part (6b) substantially separated from each other with cavities (6c), yet at two points, at least, connected with legs (6d). The effect of the connection is that the outer spring part (6b) and the inner spring part (6a) can deflect in relation to each other.

12 Claims, 4 Drawing Sheets

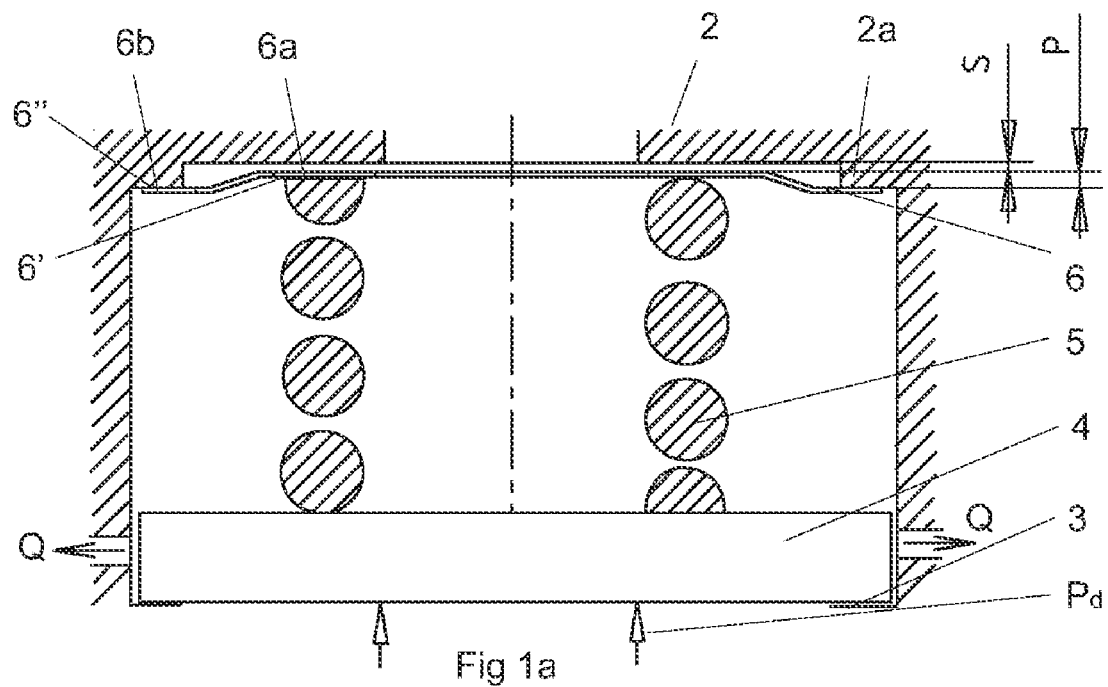
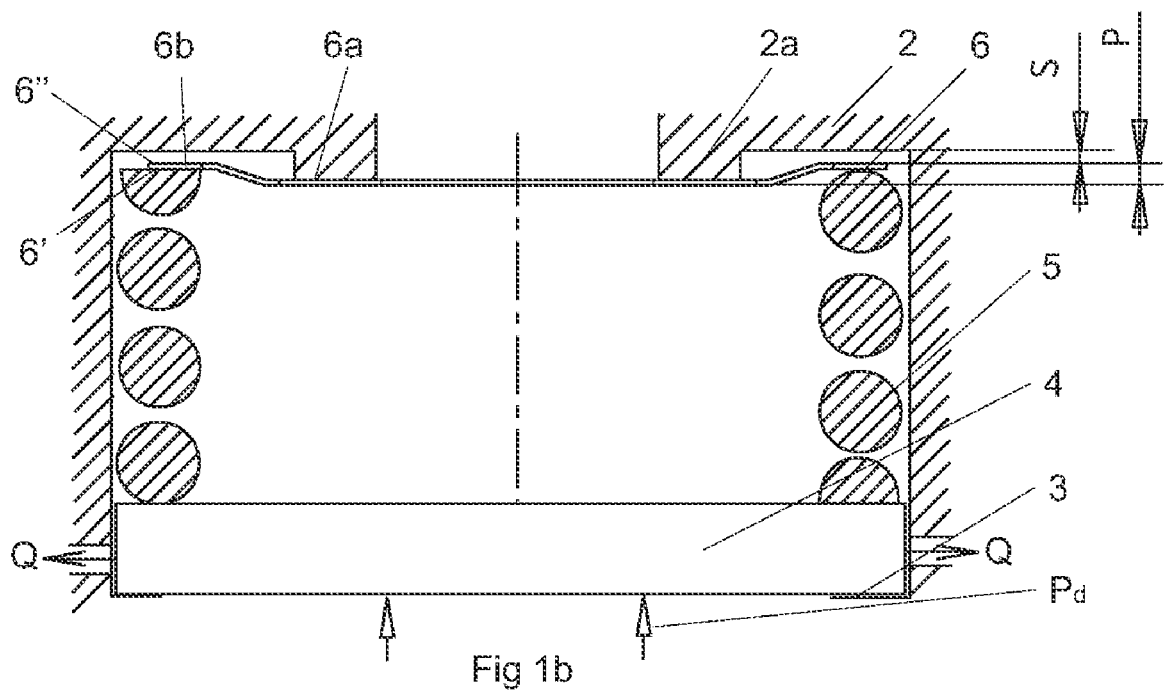

US 8,393,445 B2

SHOCK ABSORBER VALVE WITH SPRING ARRANGEMENT

CROSS-REFERENCE TO RELATED APPLICATIONS

This application is a U.S. National Phase of International Application No. PCT/SE2008/051163, filed Oct. 15, 2008, which claims priority to Swedish Patent Application No. 0702317-9, which was filed on Oct. 17, 2007.

BACKGROUND OF THE INVENTION

1. Field of the Invention

The invention relates to a valve, comprising a spring arrangement, intended to adjust a damping medium flow between the damping chambers of a shock absorber. The valves are preferably electrically controlled and intended for computer-controlled shock absorbers for vehicles.

2. Description of the Related Art

Spring arrangements consisting of a weak and a stiff spring, in which the weak spring biases the stiff spring and contributes to different spring qualities in different parts of the stroke, are used in many technical constructions, such as, for example, in valves intended to control the damping medium flow in a vehicle shock absorber. Especially in shock absorber applications in which the valves must have a precise damping pressure level without being adjustable, a low spring constant right at the start of the stroke is important. The low spring constant then passes into a higher spring constant, which is matched to the high pressures which can be generated in the absorber during rapid motions.

A known design within the field of the invention is described by the Applicant's published patent application WO2006145419. This patent application describes a shock absorber valve in the form of a pilot-operated two-stage valve, intended to control a damping medium flow between the two damping chambers of a hydraulic shock absorber. The shock absorber valve comprises a valve housing having at least a main valve with a movable valve part in the form of a main cone disposed between a main valve spring arrangement and a seat, and a pilot valve comprising a pilot slide. The main cone delimits a pilot chamber in the valve housing, in which pilot chamber the valve main spring and the pilot slide are disposed. The characteristics of the shock absorber valve are principally controlled by the pressure build-up in the pilot chamber, which is adjusted by the position of the pilot slide in the pilot chamber. This position is determined by the force equilibrium between the spring forces of one or more secondary springs, the pressure around the pilot slide and the force opposing these from an electrically controlled actuator.

The spring arrangement of the main valve has here been shown in two embodiments, in which the variation in length of the main spring and the accompanying variation in bias is absorbed by a further outside-situated spring in series, which has a significantly lower spring constant, so that the force variations become less due to the length tolerances of the stiff spring. In this way, an initial stroke is obtained, which operates with the spring constant of the weak spring, and a residual stroke, in which the weak spring has bottomed and the spring constant is determined by the stiff spring. Very stiff main springs have proved necessary in many of the present applications, and at the same time an extremely precise and low bias is required. This low bias has been created by the weak spring.

A further known variant for creating a low bias of the stiff main valve is to place an arched cup spring, a so-called Belleville spring, at the bottom in series with the main spring. It has been shown that such arched springs do not work well in association with the main spring because this construction gives too great a spread of the force-absorbing capacity of the springs. A spring element is also known which separately gives a low spring constant, see, for example, DE10312977A1 and U.S. Pat. No. 4,535,816A1. This spring is intended for use as a separate spring, however, and not in a spring arrangement together with a stiff spring.

For cost reasons, the valve housings against which the springs rest need to be formed of soft and cuttable materials with good bearing capacity. This has proved to be a poor combination together with springs with high spring forces in hard spring steel, which is likely to eat into the material. This dirties the valve and gradually produces a significant reduction of the set bias force of the valve.

Moreover, the prior art is bulky and it takes up valuable volumes required for springs with high spring constant, which must have a small length and diameter. The spring arrangements in the above-described known valve technology are also unnecessarily expensive and complicated.

SUMMARY OF THE INVENTION

Accordingly, the present invention sets out to provide a shock absorber valve which precisely adjusts a damping medium flow between the chambers of a shock absorber. This precise adjustment is made possible by including in the valve a spring arrangement comprising a stiff spring in combination with a weak spring, which regulates the position of a movable valve part in the shock absorber valve. The weak spring has a dual function and ensures a precise and low spring force with no need for a set screw or the like at the start of a motion, at the same time as wear to the inside of the valve is prevented. The invention further aims to provide a valve having a spring arrangement which is small in size and is simple and cheap to fit, produce and adjust.

The valve according to the invention is intended to adjust a damping medium flow between the damping chambers of a shock absorber, which flow is regulated by the force equilibrium of one or more valve parts which are axially movable in a valve housing. The force equilibrium is partially or mainly created by a damping medium pressure which is dependent on the damping medium flow and acts upon the movable valve part counter to the action of a spring arrangement comprising a stiff and a weak spring. The weak spring has the form of a thin, circular disc having a first and a second spring surface, and an outer and an inner spring part substantially separated from each other with cavities, yet at two points, at least, connected with legs. The effect of the connection is that the outer and the inner part can deflect in relation to each other. When the valve part moves by no more than a certain path length, the force equilibrium of the valve part is adjusted counter to the action of the spring deflection motion between the outer spring part and the inner spring part and, in the event of shifts beyond this path length, the force equilibrium is adjusted counter to the action of the stiff spring. Since the force equilibrium, at the start of the motion, is regulated by the spring deflection between the inner and outer parts of the weak spring, the position of the movable part can be regulated very precisely. A weak spring with a thin disc shape gives, moreover, a compact construction and allows greater space for the stiff spring critical to the valve characteristics. Moreover, the disc-shape construction of the weak spring contributes to a very exact bias of the stiff spring.

The stiff spring rests on the first spring surface of the weak spring and the path length is determined by a distance between the valve housing and the second spring surface of the weak spring, which is parallel with the first surface. This path length is preferably between 0.005 mm and 0.065 mm.

In a preferred embodiment of the invention, the inner and the outer spring part are parallel, but displaced relative to each other by a certain distance. The relative displacement between the inner and the outer spring part is preferably created by biasing of the weak spring between a fixed part in the valve housing and the stiff spring.

In a first embodiment of the preferred invention, the displacement between the inner spring part of the weak spring and the outer spring part of the weak spring is created by the stiff spring pressing upon the inner part of the weak spring, at the same time as the outer part of the weak spring bears against the fixed part of the valve housing. In a second embodiment, the displacement between the inner spring part of the weak spring and the outer spring part of the weak spring is created by the stiff spring pressing upon the outer part of the weak spring, at the same time as the inner part of the weak spring bears against the fixed part of the valve housing.

In these embodiments, the stiff spring bears upon the weak spring, i.e. the stiff spring never rests directly on the valve housing. Since the weak spring is made of a hard and durable spring steel plate, the hard spring arrangement is prevented from eating into the valve housing and the worn material is prevented from contaminating the damping medium in the valve. The weak spring is preferably produced by virtue of the inner and outer diameter of the spring, and the cavities between the inner and the outer part, being able to be etched or punched out of the spring steel plate.

The size of the path length is adjusted by one or more exchangeable discs or intermediate shims being placed in the valve housing such that the distance of the movable valve part to the fixed part in the valve housing is altered, without the need to remove the spring arrangement and/or the first movable valve part. With this/these discs, the gap measurement can be very precisely adjusted such that the bias force upon the stiff spring is low and acquires a minimum spread.

In a preferred embodiment of the invention, substantially similar to the second embodiment, the valve is an electrically adjustable two-stage valve which, for optimal valve function, requires a very controlled and low counterforce of the spring arrangement during the initial and/or minimum motions of the first movable valve part, i.e. at low damping medium flow velocity and low pressure.

BRIEF DESCRIPTION OF THE DRAWINGS

The invention is described in greater detail below with references to the accompanying drawings.

FIG. 1a shows a simplified diagram of a valve according to a first embodiment.

FIG. 1b shows a simplified diagram of a valve according to a second embodiment.

DETAILED DESCRIPTION OF THE PREFERRED EMBODIMENT

Figure 2:
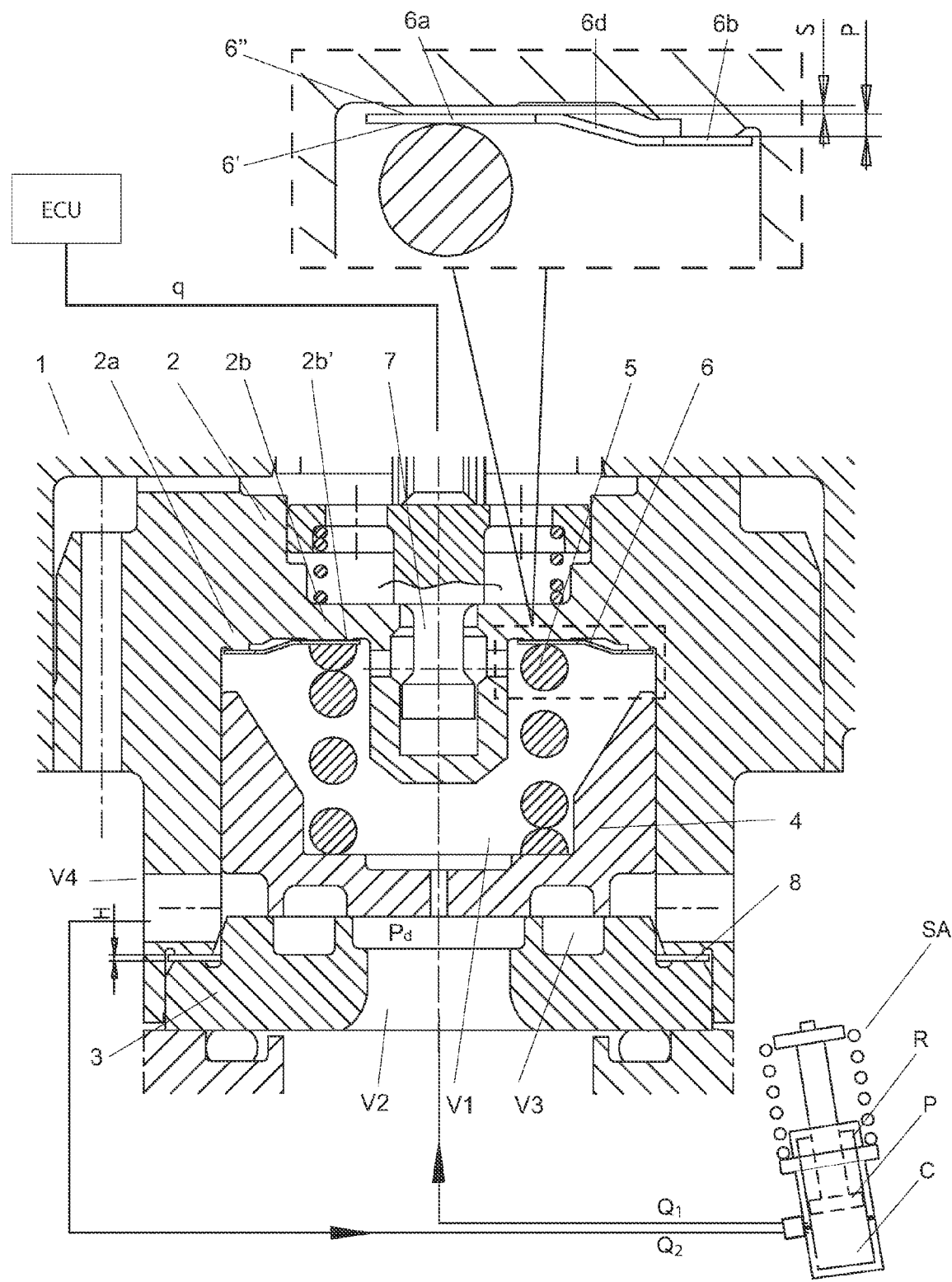
FIG. 2 shows a detailed diagram of the shock absorber valve according to the second embodiment.

FIG. 1a shows a first embodiment of the invention, in which a simplified valve 1, primarily intended to adjust the pressure of a damping medium flow Q in a shock absorber, is illustrated. The valve 1 has a valve housing 2 and a valve part 4 that is axially movable therein. The movement options of the axially movable valve part 4 are blocked by a seat 3, which can be integrated in or separate from the valve housing 2. The axially movable valve part 4 is acted upon, on the one hand, by a pressure Pd, which is dependent on the damping medium flow, and also by a spring arrangement comprising a stiff spring 5 and a weak spring 6. The weak spring 6 has a first surface 6' and a second surface 6", which are parallel-shifted relative to each other, as well as an outer spring part 6b and an inner spring part 6a, which deflect relative to each other. A displacement P between the inner spring part 6a of the weak spring and the outer spring part 6b of the weak spring is created by the weak spring 6 being biased between a fixed part 2a in the valve housing 2 and the stiff spring 5. In this embodiment, the stiff spring 5 presses upon the first surface 6' on the inner part 6a of the weak spring, at the same time as the outer part 6b of the weak spring bears with its surface 6" against the fixed part 2a of the valve housing 2. The inner part 6a of the weak spring 6 can be shifted by a path length S before bottoming in the valve housing 2. As a result of this construction, the spring deflection takes place between the inner and outer part 6a, 6b of the weak spring only as long as the movable valve part 4 has not moved by a path length longer than S. The path length S is determined by a distance between the valve housing 2 and the second spring surface 6" of the weak spring 6.

FIG. 1b shows a second embodiment of the valve, which basically works in the same way as the valve according to FIG. 1a, but in which the displacement between the inner 6a and outer spring part 6b of the weak spring is created by the stiff spring 5 pressing upon the outer part 6b of the weak spring, at the same time as the inner part 6a of the weak spring bears against the fixed part 2a of the valve housing 2. The outer part 6b of the weak spring 6 can therefore then be shifted by the path length S before bottoming in the valve housing 2.

FIG. 2 shows the valve 1, in this case a pilot-operated two-stage valve, intended for use together with a hydraulic shock absorber SA for a vehicle in which the valve controls the pressure in a damping medium flow Q1, Q2 between the two damping chambers C, R of the shock absorber. The flow through the valve paths in one direction, i.e. it is a one-way valve in which the flow Q1 paths into the valve and the flow Q2 out of the valve. The pressure Pd of the damping medium in the valve substantially determines the damping character of the absorber. In the pilot-operated valve shown in FIG. 1, the pressure is adjusted via an ECU-controlled continuous electric signal, which controls the current supply q to the valve. The flow between the two damping chambers is generated by shifting of a main piston P which is disposed in the absorber body and delimits the two damping chambers C, R.

The valve 1 is made up of at least the valve housing 2 and, in this, the first movable valve part/main cone 4 disposed between the seat 3 and the spring arrangement, which consists of a stiff valve main spring 5 in series with and biased by a weak spring 6. The spring arrangement and a second movable valve part or pilot slide 7 are disposed in a first chamber or pilot chamber V1 disposed above the first movable valve part 4. In order to obtain good valve function, the valve housing 2 has a relatively complicated form, which means that it is preferably made of a soft and easily worked material, for example EN-CW606L. The first movable valve part 4 is acted upon in the shut-off direction both by the spring arrangement and by the pressure in the first chamber V1. The pressure in the first chamber V1 is controlled by solenoid forces on the second movable part 7, which are determined by applied current in an electric actuator. In the opening direction of the first movable part 4, the main pressure in an inflow chamber V2 acts together with the pressure in an intermediate chamber V3, according to working principles described in EP 0 942 195. The flow in the inflow chamber V2 is determined by the motional velocity of the damping-chamber-delimiting main piston of the shock absorber, which means that a greater piston velocity produces a higher flow in which the valve 1 determines the pressure. In order to achieve a certain damping character of the absorber, the opposing pressure in the first chamber V1 is matched to the desired damping, thus the damping character is controlled in two stages. The valve 1 is also a one-way valve, inasmuch as the medium during normal working always flows in the direction away from the inflow chamber V2, via the intermediate chamber V3, to an outflow chamber V4 arranged with the lowest pressure level downstream.

In an electrically adjustable two-stage valve for a shock absorber, for optimal valve function a very controlled and low counterforce of the spring arrangement during the initial and/or minimum motions of the first movable valve part is required, i.e. at low damping medium flow velocity and low pressure. According to the invention, this low counterpressure is created by the spring arrangement, comprising the weak spring 6 and the stiff spring 5 placed in series with each other. As a result of this serial connection of the springs, the weak spring 6 can be said to bias the stiff spring 5 with a low, precisely set bias.

Figure 3:
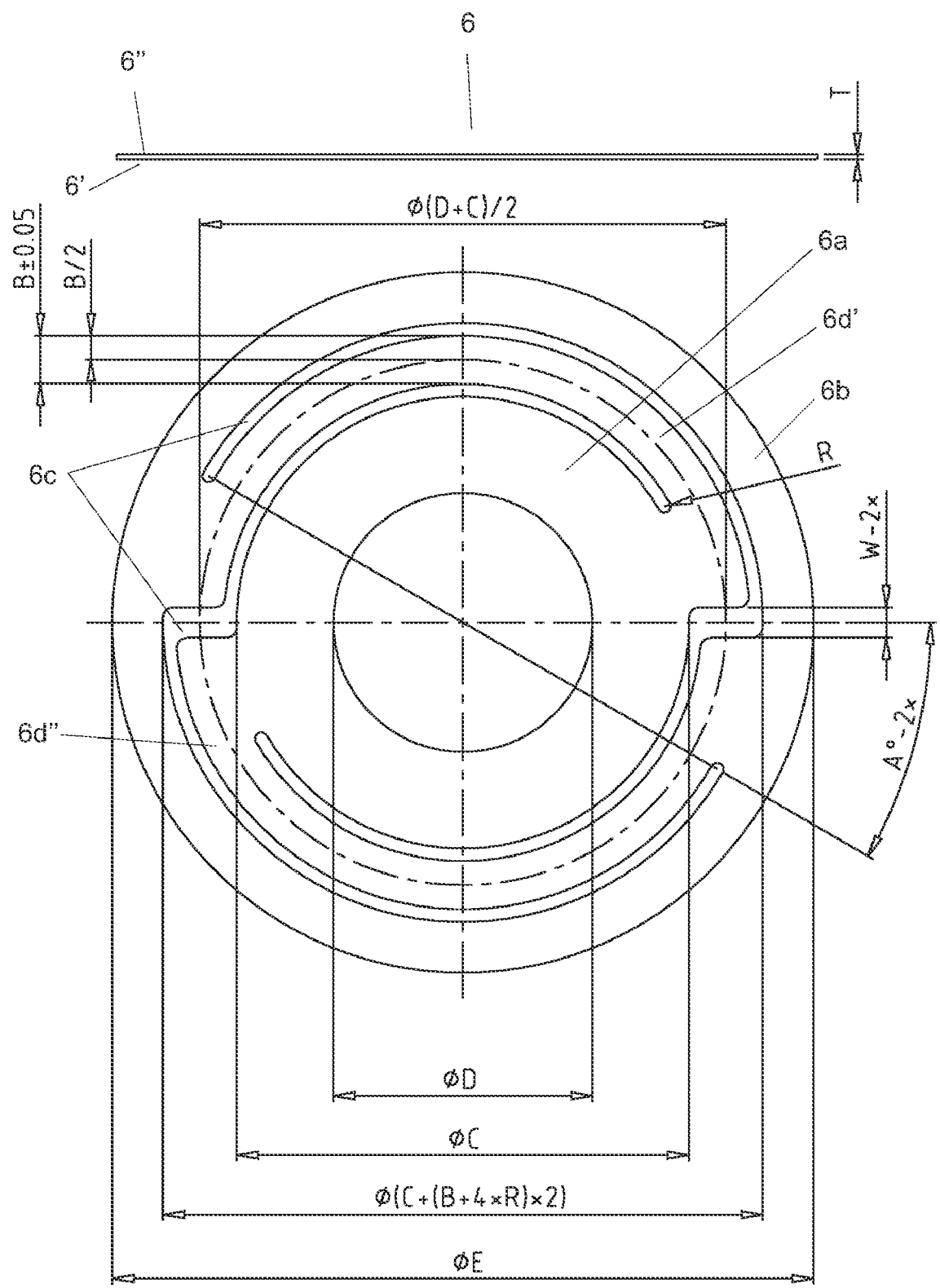
FIG. 3 shows a first embodiment of the weak spring in the spring arrangement.
Figure 4:
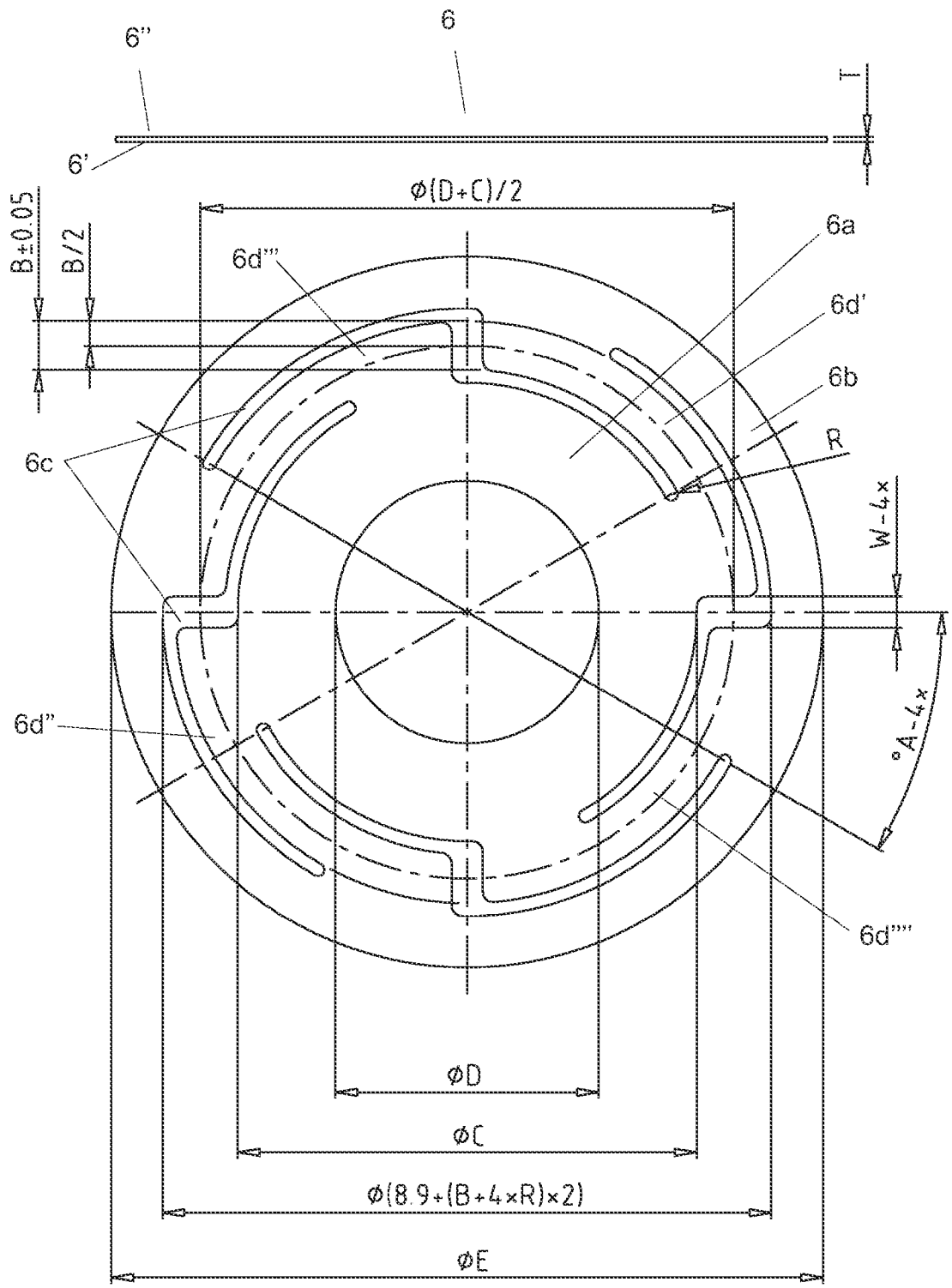
FIG. 4 shows a second embodiment of the weak spring in the spring arrangement.

The weak spring 6, which is shown more clearly in FIGS. 3 and 4, has the form of a shim spring, i.e. a thin, circular disc having an inner spring part 6a and an outer spring part 6b. The two parts 6a, 6b are substantially separated from each other with cavities 6c, but are held together at two places, at least, with legs 6d, so that the outer spring part 6b and the inner spring part 6a can deflect in relation to each other. Preferably, the weak spring 6 is made of a sufficiently thin disc that the inner diameter D and the outer diameter E of the spring, and the cavities 6c between the inner spring part 6a and the outer spring part 6b can be etched or punched out of a spring steel plate.

In FIG. 1, it can be seen how the weak spring 6 and the valve housing 2 have been matched to each other by the inner spring part 6a and the outer spring part 6b being displaced relative to each other in the valve housing 2 by the distance P. The displacement between the inner spring part 6a and the outer spring part 6b is created by the stiff spring 5 pressing upon the inner spring part 6a of the weak spring 6, at the same time as the outer spring part 6b of the weak spring 6 bears against the outer valve housing part 2a.

The bearing surface 2a' of the weak spring 6 against the outer part 2a of the valve housing 2 is likewise displaced, relative to an inner part 2b contained in the valve housing 2, by a distance somewhat greater than P, in such a way that a gap S is created between the inner part 6a of the weak spring 6 and the inner part 2b of the valve housing 2 when the stiff spring 5 is in the fully outwardly deflected state.

The bias force of the spring arrangement is substantially determined by the stiffness of the weak spring 6 and the measurement P in the fitted state. During operation, the first movable valve part 4 leaves the seat 3, the spring assembly creating the necessary actuating force for the hydraulic working of the valve 1. This actuating force is very low and precise during the first hundredths of the stroke, in which the actuating force is virtually only determined by the weak spring 6. In further larger strokes, S=O and the actuating force is determined exclusively by the stiff spring 5.

The length tolerance of the stiff spring 5 is normally very large, normally around ±0.1 mm, whilst the demand made upon the gap S is only a few hundredths, so that an assembly-based adjustment has to be made. This is done by one or more exchangeable discs or intermediate shims 8 being placed between a lower valve housing part 2c and the main seat 3. The measurement H of the exchangeable intermediate shim 8 is chosen during assembly and testing, so that the measurement S acquires the correct span, which can preferably be around 0.035±0.03 mm. The design and placement of the intermediate shim 8 allows an adjustment procedure in which the gap measurement S can be changed without removing the spring arrangement and/or the first movable valve part 4.

Since the stiff spring 5 bears against and presses upon the inner part 6a of the weak spring 6, which is made of hard spring steel, the soft material in the valve housing 2 is protected from abrasive wear. This means that the share of added contaminants in the damping medium passing between the flow chambers V1, V2, V3 and V4 of the valve can be reduced and the working of the valve can be improved and kept constant for longer.

In FIGS. 3 and 4 are shown, by way of example, on the one hand, a two-legged and, on the other hand, a four-legged embodiment of the weak spring 6, in which it can be seen how the inner spring part 6a and the outer spring part 6b are held together by the spring legs 6d. The diameters C and D have respective measurement quantities matched to the inner part 2a of the valve housing 2 and to the stiff spring 5 in FIG. 2. The diameter E is tailored to the outer part 2b of the valve housing 2, and the measurements A and W substantially determine the length and number of the spring legs.

The stiffness of the weak spring 6 is determined by the number of legs n, the leg length, thickness T and width B. The table below shows an example of how, in a given geometry, the stiffness can be reduced by reducing the measurement B firstly of two spring legs (FIG. 2) 6d', 6d'', and then of four spring legs (FIG. 4) 6d', 6d'', 6d''', 6d''''. With a greater number of spring legs, a thinner shim plate can be used, at the same time as the spring 6 acquires a higher stiffness, a shorter spring path and a more compact installation than when a lesser number of spring legs is used. Example in which: E=14.8 mm, C=8.9 mm, D=5.1 mm, A=40 degrees and W=0.6 mm

| Measurement T mm | Measurement B Mm | Measurement R mm | Number of legs n (units) |
|---|---|---|---|
| 0.25 | 0.9 | 0.15 | 2 |
| 0.25 | 0.7 | 0.2 | 2 |
| 0.25 | 0.5 | 0.25 | 2 |
| 0.25 | 0.4 | 0.4 | 2 |
| 0.1 | 0.9 | 0.15 | 4 |
| 0.1 | 0.7 | 0.2 | 4 |
| 0.1 | 0.5 | 0.25 | 4 |
| 0.1 | 0.4 | 0.4 | 4 |

Naturally, these measurements are only an example and can be varied over wide limits.

The invention is not limited to the embodiment shown above by way of example, but can be modified within the scope of the following patent claims and the inventive concept. For example, this precise regulation of the spring force can be used also in other types of shock absorber valves, such as various types of single-stage or check valves biased by springs.

The invention claimed is:

1. A valve intended to adjust the pressure of a damping medium flow between the damping chambers of a shock absorber, which flow is regulated by the force equilibrium of one or more valve parts that are axially movable in a valve housing, the force equilibrium being partially or mainly created by a damping medium pressure which is dependent on the damping medium flow and acts upon the movable valve part counter to the action of a spring arrangement comprising a stiff spring and a weak spring, characterized in that the weak spring has the form of a thin, circular disc having a first spring surface and a second spring surface, and an inner spring part and an outer spring part substantially separated from each other with cavities, yet at two points, at least, the inner spring part and the outer spring part are connected with legs, so that the outer spring part and the inner spring part can deflect in relation to each other, and when the valve part moves by no more than a path length, the force equilibrium of the valve part is adjusted counter to the action of said deflection motion between the outer spring part and the inner spring part and, in the event of shifts beyond this path length, the force equilibrium is adjusted counter to the action of the stiff spring.

2. The valve as claimed in claim 1, wherein the stiff spring rests on the first spring surface of the weak spring, and the path length is determined by a distance between the valve housing and the second spring surface of the weak spring, which is parallel with the first surface.

3. The valve as claimed in claim 2, wherein the path length is preferably between 0.005 mm and 0.065 mm.

4. The valve as claimed in claim 2, wherein the inner spring part and the outer spring part are displaced relative to each other by a displacement distance.

5. The valve as claimed in claim 4, wherein the relative displacement between the inner spring part and the outer spring part is created by the weak spring being biased between a fixed part in the valve housing and the stiff spring.

6. The valve as claimed in claim 5, wherein the displacement distance between the inner spring part of the weak spring and the outer spring part of the weak spring is created by the stiff spring pressing upon the inner part of the weak spring while the outer part of the weak spring bears against the fixed part of the valve housing.

7. The valve as claimed in claim 6, wherein the weak spring prevents the stiff spring from being abrasively worn in the valve housing by being placed between the housing and the stiff spring.

8. The valve as claimed in claim 5, wherein the displacement distance between the inner spring part of the weak spring and the outer spring part of the weak spring is created by the stiff spring pressing upon the outer part of the weak spring while the inner part of the weak spring bears against the fixed part of the valve housing.

9. The valve as claimed in claim 2, wherein the length of the path length is adjusted by one or more exchangeable discs being placed in the valve housing such that the distance of the movable valve part to the fixed part in the valve housing is altered.

10. The valve as claimed in claim 9, wherein the path length can be changed without removing the spring arrangement and/or the movable valve part from the housing.

11. The valve as claimed in claim 2, wherein the weak spring is made of a sufficiently thin disc that the inner and outer diameters of the spring, and the cavities between the inner and the outer spring part, can be etched or punched out of a spring steel plate.

12. The valve as claimed in claim 2, wherein the valve is an electrically adjustable two-stage valve, which regulates the damping character of the absorber via an ECU-controlled continuous electric signal which controls a current supply to the valve.

* * * * *